(12) United States Patent
Madeira et al.

(10) Patent No.: US 9,726,123 B2
(45) Date of Patent: Aug. 8, 2017

(54) AIR FILTER, FILTER ELEMENT AND FILTER HOUSING OF AN AIR FILTER

(71) Applicant: MANN+HUMMEL GMBH, Ludwigsburg (DE)

(72) Inventors: Pedro Miguel Pereira Madeira, Bietigheim-Bissingen (DE); Pascal Neef, Renningen (DE); Nadine Sorger, Stuttgart (DE); Irmgard Thalmann, Waiblingen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 452 days.

(21) Appl. No.: 14/017,767

(22) Filed: Sep. 4, 2013

(65) Prior Publication Data

US 2014/0373495 A1 Dec. 25, 2014

(30) Foreign Application Priority Data

Jun. 20, 2013 (DE) ......................... 10 2013 010 218

(51) Int. Cl.
*F02M 35/024* (2006.01)
*F02M 35/02* (2006.01)
(Continued)

(52) U.S. Cl.
CPC ... *F02M 35/02483* (2013.01); *B01D 46/0005* (2013.01); *B01D 46/009* (2013.01); *B01D 46/0041* (2013.01); *B01D 46/2411* (2013.01); *B01D 46/2414* (2013.01); *F02M 35/0203* (2013.01); *F02M 35/0204* (2013.01);
(Continued)

(58) Field of Classification Search
CPC ............ B01D 46/0005; B01D 46/0041; B01D 46/009; B01D 46/2414; B01D 2275/201; B01D 2275/208; B01D 2265/026; F02M 35/02433; F02M 35/0203; F02M 35/02483; F02M 35/02425; F02M 35/09
See application file for complete search history.

(56) References Cited

U.S. PATENT DOCUMENTS 1,704,614 A * 3/1929 Jonston ................... B60R 7/084
  242/598.4
3,116,030 A * 12/1963 Leotta .................. A47K 10/405
  242/596.3

(Continued)

*Primary Examiner* — Amber R Orlando
*Assistant Examiner* — Britanny Precht
(74) *Attorney, Agent, or Firm* — James Hasselbeck

(57) ABSTRACT

An air filter (10) includes an openable filter housing (12) and a filter element (18). The filter housing (12) includes an inlet (26) and an outlet. A filter element (18) with a filter medium (46) is disposed replaceably in the filter housing separating the inlet (26) from the outlet (22). The filter element (18) features on an exterior side facing away from the element interior space (52) on an axial front face relative to the element axis (32) at least one supporting element (58) having at least one supporting lateral surface (60, 61) with at least one cylindrical portion and/or at least one portion with a variable cross-section in the direction of a main axis. The supporting element (58) is supported at least transversely in relation to the element axis (32) with the at least one supporting lateral surface (60, 61) against at least one corresponding support portion (42) on the side of the filter housing (12).

12 Claims, 8 Drawing Sheets

(51) Int. Cl.
  *B01D 46/24* (2006.01)
  *B01D 46/00* (2006.01)
  *F02M 35/09* (2006.01)

(52) U.S. Cl.
  CPC ..... *F02M 35/02416* (2013.01); *F02M 35/02425* (2013.01); *F02M 35/02433* (2013.01); *B01D 2265/026* (2013.01); *B01D 2275/201* (2013.01); *B01D 2275/208* (2013.01); *F02M 35/09* (2013.01)

(56) References Cited

U.S. PATENT DOCUMENTS

| | | | | |
|---|---|---|---|---|
| 3,282,519 A * | 11/1966 | Rheinstrom | ........... | A47K 10/38 242/596.8 |
| 3,692,186 A * | 9/1972 | Marzocchi | ......... | B01D 39/2017 210/494.1 |
| 4,065,276 A * | 12/1977 | Nakaya | ............. | B01D 46/2403 181/229 |
| 4,105,561 A * | 8/1978 | Domnick | ............. | B01D 17/045 210/232 |
| 4,135,899 A * | 1/1979 | Gauer | ................ | B01D 46/0024 210/338 |
| 4,151,095 A * | 4/1979 | Wright | ................... | B01D 29/07 156/218 |
| 4,204,846 A * | 5/1980 | Brenholt | ........... | B01D 46/0005 55/288 |
| 4,304,580 A * | 12/1981 | Gehl | ................. | B01D 46/0004 210/338 |
| 4,482,367 A * | 11/1984 | Howeth | ............. | B01D 46/0005 406/172 |
| 4,507,203 A * | 3/1985 | Johnston | ................ | B01D 29/15 210/445 |
| 4,535,947 A * | 8/1985 | Hidle | ..................... | A47K 10/38 242/129.51 |
| 4,758,256 A * | 7/1988 | Machado | ........... | B01D 46/0005 210/232 |
| 5,071,456 A * | 12/1991 | Binder | ............... | B01D 46/2414 55/502 |
| 5,763,984 A * | 6/1998 | Day | ................... | A47K 10/3827 242/596.8 |
| 6,056,235 A * | 5/2000 | Brozinsky | .............. | A47K 10/32 242/598.6 |
| 6,385,810 B1 * | 5/2002 | Lang | ...................... | A47L 9/102 15/352 |
| 6,425,932 B1 * | 7/2002 | Huehn | ............... | B01D 46/0005 55/471 |
| 6,569,219 B1 * | 5/2003 | Connor | .............. | B01D 46/2414 55/490 |
| 6,968,596 B2 * | 11/2005 | Oh | .......................... | A47L 9/104 15/353 |
| 7,063,730 B2 * | 6/2006 | Connor | .............. | B01D 46/0005 55/493 |
| 7,810,210 B2 * | 10/2010 | Yoo | .......................... | A47L 5/225 15/327.2 |
| 7,931,722 B2 * | 4/2011 | Sepke | ..................... | A47L 9/165 15/347 |
| 2001/0018865 A1 * | 9/2001 | Wegelin | ..................... | A47L 5/28 95/268 |
| 2002/0073663 A1 * | 6/2002 | Sepke | ....................... | A47L 5/28 55/467 |
| 2002/0073667 A1 * | 6/2002 | Barris | ............... | B01D 39/1623 55/486 |
| 2003/0217534 A1 * | 11/2003 | Krisko | ................... | B01D 45/12 55/337 |
| 2008/0010958 A1 * | 1/2008 | Fester | ..................... | A47L 9/122 55/472 |
| 2008/0250763 A1 * | 10/2008 | Widerski | ........... | B01D 46/0005 55/357 |
| 2009/0094951 A1 * | 4/2009 | Baseotto | ........... | B01D 46/0005 55/498 |
| 2010/0000414 A1 * | 1/2010 | Williams | ........... | B01D 46/2414 96/226 |
| 2013/0086877 A1 * | 4/2013 | Kori | ................... | B01D 46/0024 55/482 |
| 2013/0263744 A1 * | 10/2013 | Osendorf | ........... | B01D 46/0005 96/380 |
| 2014/0298612 A1 * | 10/2014 | Williams | ................... | A47L 9/10 15/347 |

* cited by examiner

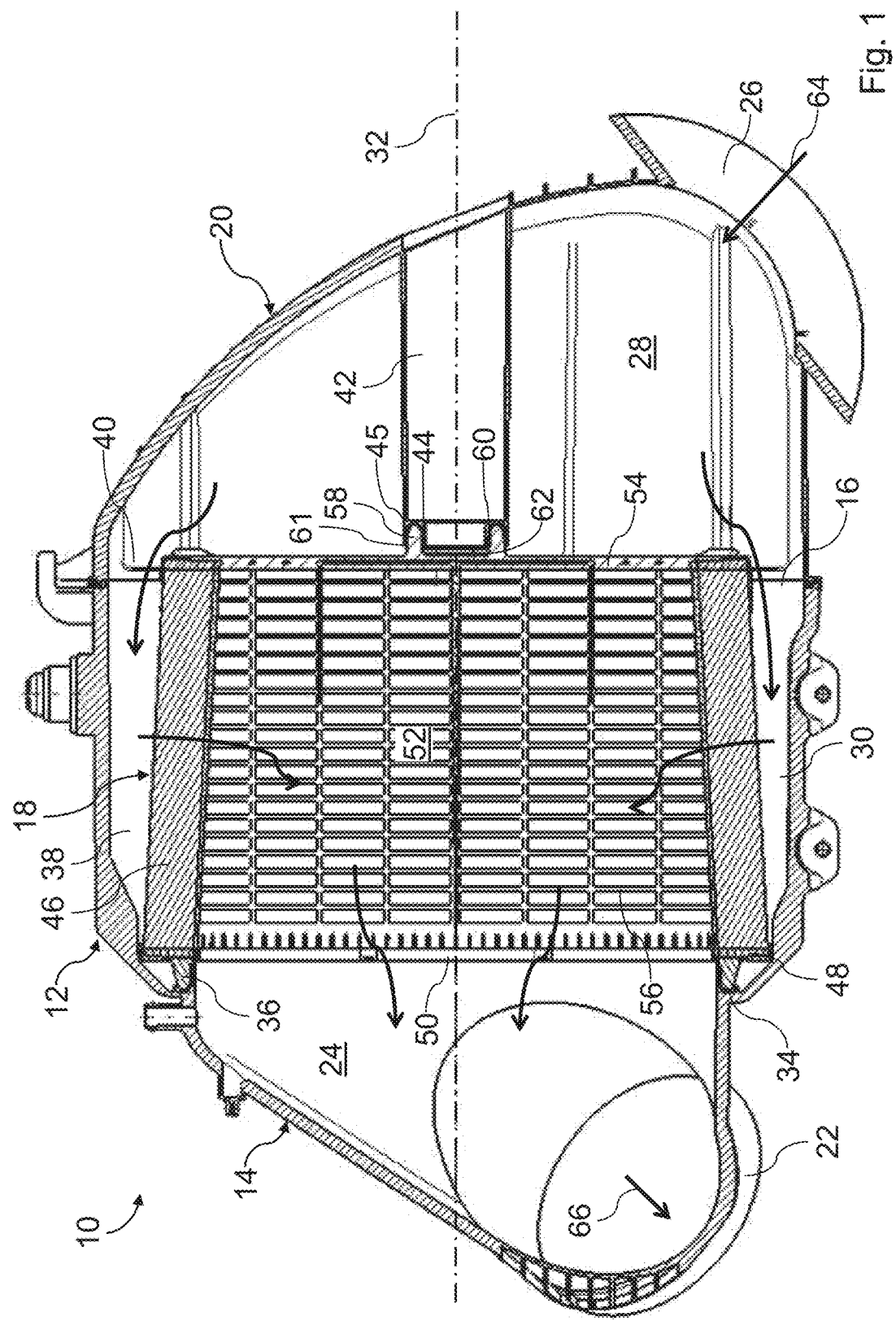

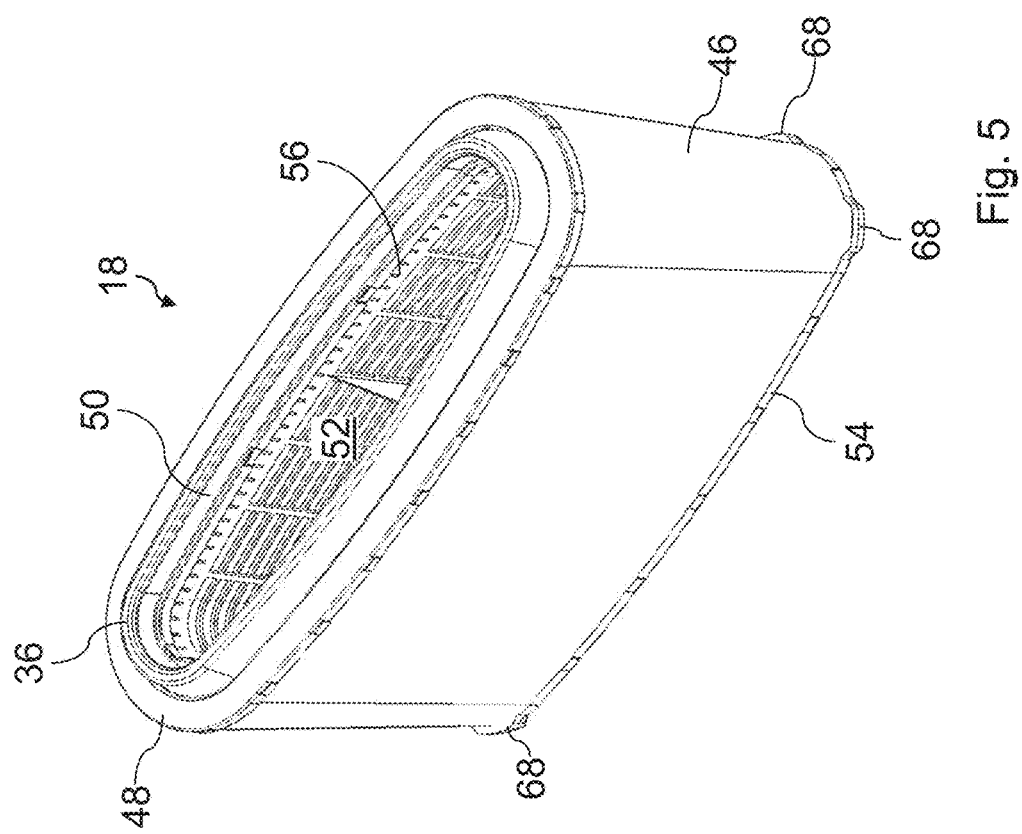
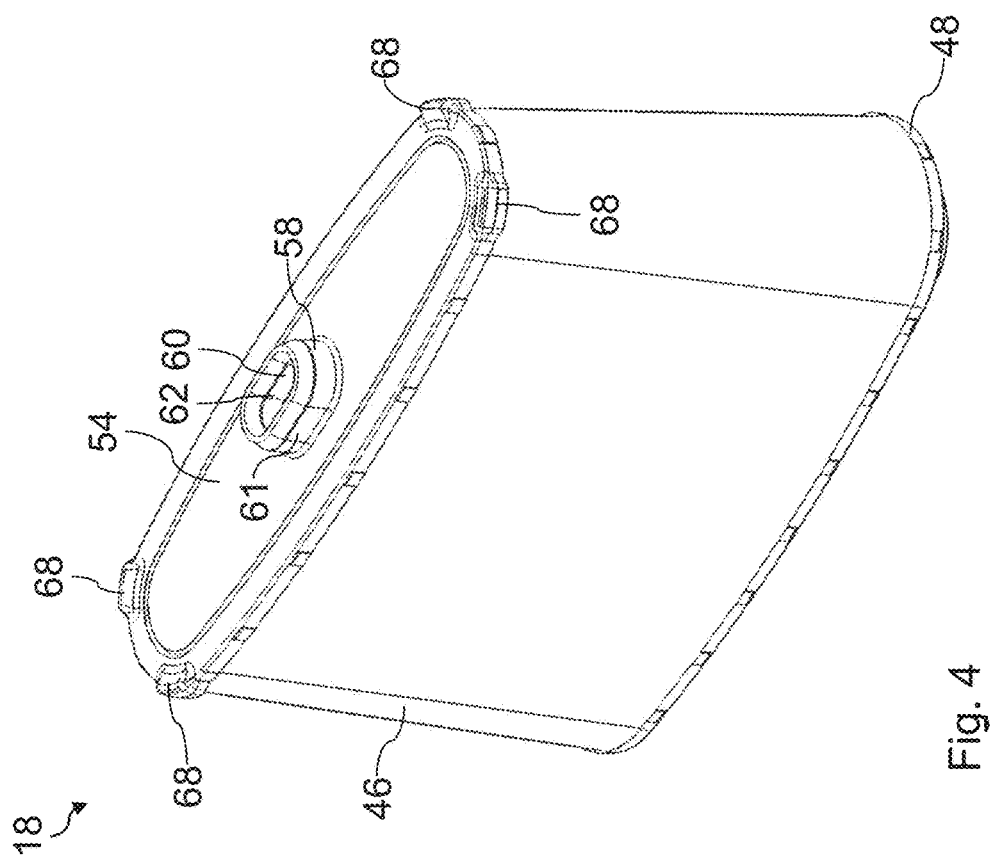

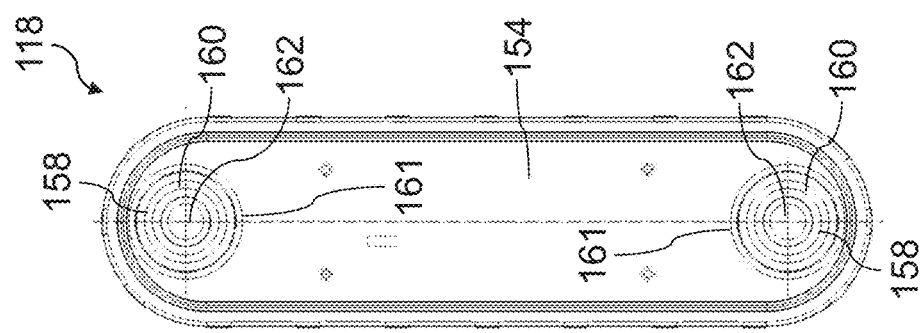
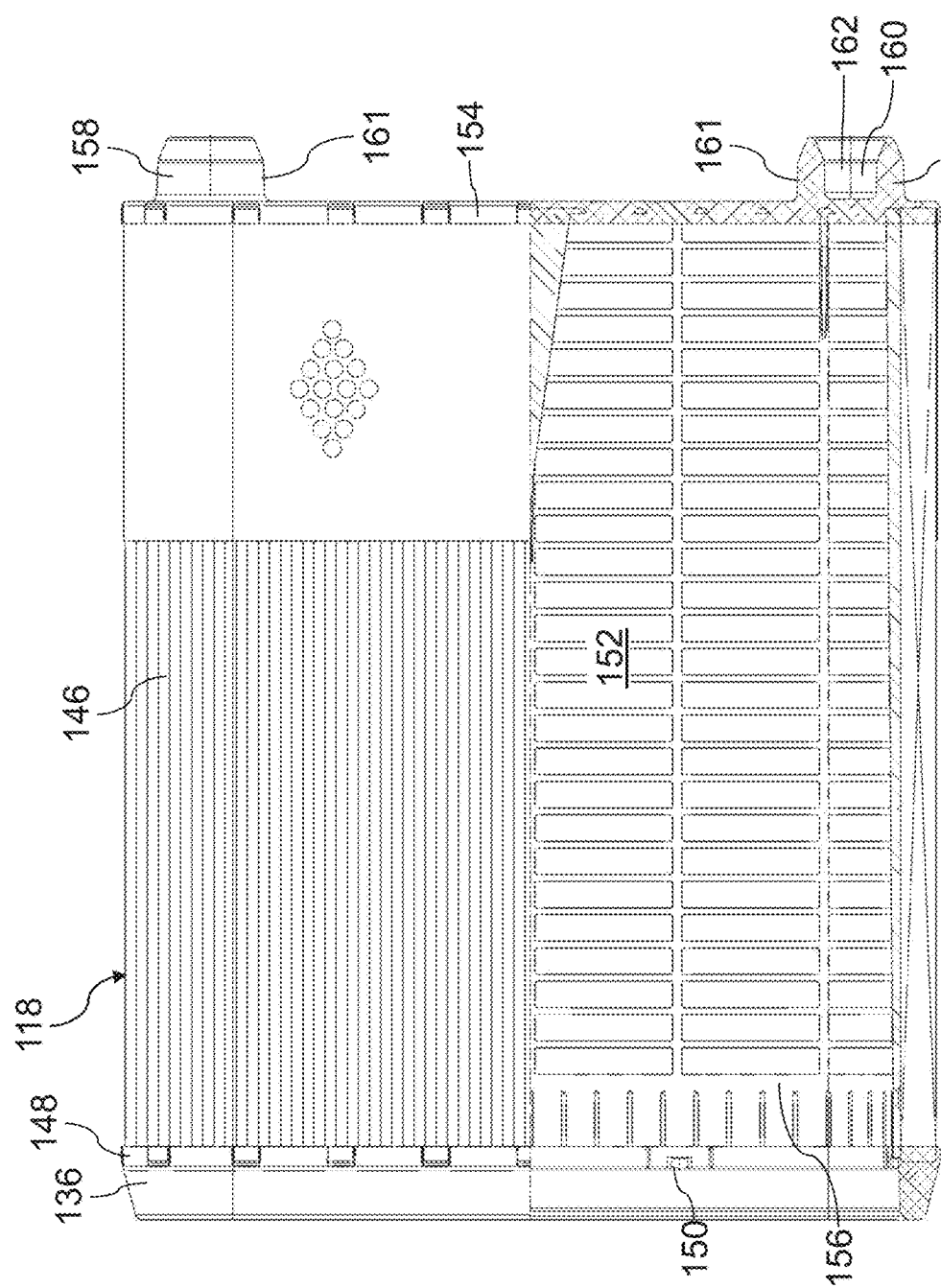

AIR FILTER, FILTER ELEMENT AND FILTER HOUSING OF AN AIR FILTER

CROSS-REFERENCE TO RELATED APPLICATIONS

This application claims the benefit of German patent application no. 102013010218.9, filed Jun. 20, 2013, the entire disclosure of which is incorporated herein by reference.

TECHNICAL FIELD

The invention relates to an air filter, in particular of an internal combustion engine, in particular of a motor vehicle, in particular of a commercial vehicle, with an openable filter housing that features at least one inlet for air to be cleaned and at least one outlet for cleaned air and in which a filter element with a filter medium for filtering air, that encloses an element interior space relative to an element axis, is disposed replaceably in such a way that it separates the at least one inlet from the at least one outlet.

The invention relates furthermore to a filter element of an air filter, in particular of an internal combustion engine, in particular of a motor vehicle, in particular of a commercial vehicle, in particular of an air filter according to the invention, with a filter medium for filtering air, that encloses an element interior space relative to an element axis.

The invention relates furthermore to a filter housing of an air filter, in particular of an internal combustion engine, in particular of a motor vehicle, in particular of a commercial vehicle, in particular of an air filter according to the invention that is openable and that features at least one inlet for air to be cleaned and at least one outlet for cleaned air and in which a filter element with a filter medium for filtering air, that encloses an element interior space relative to an element axis, can be disposed replaceably in such a way that it separates the at least one inlet from the at least one outlet.

PRIOR ART

An air filter of an air intake tract of an internal combustion engine of a motor vehicle known on the market features a filter housing consisting of a housing pot and a housing cover. The housing cover can be detached from the housing pot for opening the filter housing. The filter housing features an inlet for air to be cleaned and an outlet for cleaned air. A round filter element is disposed in the filter housing in such a way that it separates the inlet from the outlet. The round filter element features a filter medium for filtering the air, which encloses an element interior space circumferentially relative to an element axis. The filter element is disposed replaceably in the filter housing.

The object of the invention is to design an air filter, a filter element and a filter housing of an air filter of the above-mentioned type in which a positioning and/or a holding of the filter element in the filter housing are improved, in particular simplified.

SUMMARY OF THE INVENTION

This object is achieved according to the invention in that the filter element features at least one supporting element on at least one axial front face relative to the element axis on an exterior side facing away from the element interior space that has at least one cylindrical portion and/or one portion with a variable cross-section in the direction of a main axis, the main axis of which extending axially or parallel in relation to the element axis, and with which the supporting element is supported by at least one corresponding support portion on the side of the filter housing at least transversely in relation to the element axis.

According to the invention, the at least one supporting element and therefore the filter element is supported at least transversely in relation to the element axis, in particular radially or tangentially in relation to another axis, which is parallel to the element axis. By so doing, the filter element can be positioned and held in radial direction relative to the element axis. Because of the arrangement of the at least one supporting element, the filter element can be installed axially as a whole on the exterior side of the front face. In this way, it can be disposed in a space-saving manner.

If the filter element is correctly installed, the element axis can advantageously extend coaxially in relation to a housing axis of the filter housing. By so doing, the air filter can be installed coaxially as a whole. In this way, the required space of the air filter can be further reduced. The element axis and/or the housing axis can advantageously extend axially in relation to a mounting direction of the filter element relative to the filter housing, in particular relative to a housing component with the at least one support portion. In this way, the filter element can be easily introduced in axial direction into the filter housing. The filter element can in particular be introduced in axial direction into a corresponding housing component, in particular into a housing pot, of the filter housing. Advantageously, one of the housing components, in particular the housing cover, can be put in axial direction onto the filter element and the other housing component.

Advantageously, the at least one supporting element can be additionally supported in axial direction relative to the element axis in the filter housing. By so doing, the axial position of the filter element can also be predefined. Advantageously, the filter element can be clamped and held in axial direction between two oppositely positioned support portions of the filter housing.

The at least one supporting lateral surface can advantageously have a completely cylindrical form. A cylindrical form allows an optimal force transmission from the at least one supporting lateral surface or on the at least one supporting lateral surface radially in relation to a main axis of the at least one supporting lateral surface. As an alternative, the supporting lateral surface can feature a variable cross-section along a main axis. In this connection, the contour and/or the dimensions of the cross-sectional area can be variable. The at least one supporting lateral surface can in particular have a completely conical form. The conical form allows to simplify an introduction of the at least one support portion into the at least one supporting lateral surface and/or an introduction of the at least one supporting lateral surface into the at least one support portion. The at least one supporting lateral surface can also be assembled of cylindrical portions and portions with variable cross-section, in particular conical portions.

The at least one supporting lateral surface can advantageously at least sectionwise be straight-cylindrical and/or straight-conical. The at least one supporting lateral surface can also at least sectionwise be slanted-cylindrical and/or slanted-conical.

The at least one supporting lateral surface can advantageously define an oval, flat oval or round cross-section. It can also define a different, in particular an angular, cross-section.

The at least one supporting lateral surface can be enclosed circumferentially. It can also feature discontinuities.

The at least one supporting element can also feature more than one supporting lateral surface, preferably two supporting lateral surfaces. By so doing, the support can be improved.

Advantageously, the at least one supporting element can feature a hollow-cylindrical or sleeve-like portion. A radially inner supporting lateral surface can be realized relative to the main axis of the at least one supporting element by the radially inner circumferential side of the hollow-cylindrical or sleeve-like portion. As an alternative or in addition, a radially outer supporting lateral surface can be realized by the radially outer circumferential side of the hollow-cylindrical or sleeve-like portion.

If the filter element is correctly mounted, the hollow-cylindrical or sleeve-like portion can advantageously be inserted into a corresponding frontal groove, in particular counter-support groove, of the at least one support portion. The groove can be considered as hollow space of the support portion which is open towards the free front face of the support portion. The radially inner supporting lateral surface of the at least one supporting element can be supported by a corresponding radially inner counter-supporting lateral surface of the at least one support portion. As an alternative or in addition, the radially outer supporting lateral surface of the at least one supporting element can be supported by a corresponding radially outer counter-supporting lateral surface of the at least one support portion.

As an alternative, the at least one supporting element can feature a frontal groove, in particular a supporting groove, which extends circumferentially relative to the main axis. The groove can advantageously be in a front face of the at least one supporting element facing away from the filter element. The groove can be considered as hollow space of the at least one supporting element which is open towards the free front face thereof. A radially inner supporting lateral surface can be realized as the radially inner circumferential side of the groove relative to the main axis of the at least one supporting element.

As an alternative or in addition, a radially outer supporting lateral surface can be realized as the radially outer circumferential side of the groove relative to the main axis of the at least one supporting element. A corresponding hollow-cylindrical or sleeve-like portion of the at least one support portion can be inserted into the frontal groove of the at least one supporting element. The radially inner supporting lateral surface of the at least one supporting element can be supported by a corresponding radially inner counter-supporting lateral surface of the at least one support portion. As an alternative or in addition, the radially outer supporting lateral surface of the at least one supporting element can be supported by a corresponding radially outer counter-supporting lateral surface of the at least one support portion.

Advantageously, the filter housing can be assembled of at least two housing components. For opening the filter housing, the two housing components can advantageously be separated completely or partially from each other. In particular, one of the housing components can be a housing pot. The filter element can be disposed in the housing pot. The housing pot can advantageously be coaxial in relation to a housing axis. Advantageously, it can have a coaxial mounting opening for the filter element in relation to the housing axis. In this way, the filter element can easily be installed in axial direction relative to the housing axis through the mounting opening in the housing pot. Another housing component can advantageously be a housing cover. The mounting opening of the housing pot and therefore the filter housing can be closed by means of the housing cover. The at least one inlet and the at least one outlet can be disposed in the same or in different housing components.

The at least one support portion can advantageously be located on one of the housing components. The at least one support portion can advantageously be located on the housing cover. In this way, the positioning of the filter element and/or the assembly of the at least one supporting element with the at least one support portion can be simplified.

Advantageously, the filter element can be supported by the other housing component on the front face opposing the at least one supporting element.

Advantageously, the at least one supporting element and the at least one support portion cannot have a sealing function. By so doing, the supporting function can be separated from each other and optimized respectively. A corresponding sealing function can at least be allocated to another component combination separated from the at least one supporting element and the at least one support portion and optimized separately. In another embodiment, the supporting element and the support portion can have a sealing function. This is for example necessary when the support portion at the housing features a continuous opening towards the outer surrounding.

Advantageously, the at least one supporting element can be at least partially resilient. By so doing, possible mounting tolerances of the filter element in the filter housing can be easily compensated for with the at least one supporting element. Furthermore, the at least one supporting element can be used additionally as vibration damper, in particular during operation of the air filter. Advantageously, the at least one supporting element can be made of a resilient synthetic material, in particular polyurethane (PUR). Polyurethane can be connected directly or indirectly in an easy manner with the filter medium by means of a corresponding connector body, in particular of an end body or an end disk. The at least one supporting element can advantageously be foamed at or on the filter medium or the connector body.

Advantageously, the element interior space on the front face of the filter element, at which the at least one supporting element is disposed, can be closed. By so doing, a flow of air from the element interior space or into the element interior space can be prevented there. In this way, it can be realized that the air has to flow through the filter medium. The air can flow through the filter medium from radially outside to radially inside into the element interior space or out of it in reverse direction. The air can flow through a corresponding flow through opening on the other front face of the filter element into the element interior space or out of it.

The filter element can advantageously be a hollow filter element, in particular a round filter element with a round cross-section, an oval round filter element with an oval cross-section, a flat oval round filter element with a flattened oval cross-section, a conical round filter element with a round cross-section that tapers in axial direction in relation to the main axis, a conical-oval round filter element with an oval cross-section that tapers in axial direction at least in the direction of a transverse axis, a conical flat oval round filter element with a flat oval cross-section that tapers in axial direction at least in the direction of a transverse axis, or a hollow filter element with a different, in particular angular, cross-section and/or a different axial cross-sectional development in the direction of the main axis.

The filter medium can advantageously be closed circumferentially, in particular folded in a star-shaped, in particular in a zigzag or wavy manner. The filter medium can be closed circumferentially also in an unfolded manner.

The filter medium can be filter paper, filter fleece or a different filter medium appropriate for filtering air. The filter medium can be single-layer or multi-layer.

The filter element can advantageously feature a support structure, in particular a support tube. The support structure can advantageously be disposed in the element interior space. A support structure, which surrounds the filter medium radially outside, can also be provided. A peripheral wall of the support structure can advantageously be permeable for air. The peripheral wall can advantageously be skeletal or grid-like. The support structure can advantageously be made of synthetic material. The filter medium can advantageously be supported by the support structure.

The air filter can advantageously be part of an air intake tract of an internal combustion engine. It can be used for cleaning the combustion air that is conveyed to the internal combustion engine. However, the invention is not limited to an air filter of an air intake tract of an internal combustion engine of a motor vehicle, in particular of a truck. Rather, it can also be used with different air systems of motor vehicles. Advantageously, the air filter can also be a cabin air filter. The air filter can also be used outside of the automotive technology, in particular with industrial engines. Advantageously, the air filter can be part of an air intake system of a commercial vehicle, in particular of a truck, a bus, a construction machine or an agricultural machine. The air intake system can advantageously be disposed on a vertical wall, in particular a backside, a drivers cab of a commercial vehicle.

In an advantageous embodiment, the at least one support portion can feature at least one counter-supporting lateral surface, which can have at least one cylindrical portion and/or at least one portion with a variable cross-section in the direction of a main axis, in particular a conical portion, and the main axis of which can extend axially or parallel in relation to a housing axis which can be coaxial in relation to the element axis when the filter element is installed. By so doing, the at least one counter-supporting lateral surface and the at least one supporting lateral surface can have the same orientation when the filter element is installed.

Advantageously, the main axes of the at least one supporting lateral surface and the at least one counter-supporting lateral surface can extend coaxially when the filter element is mounted. By so doing, the at least one counter-supporting lateral surface can be easily inserted onto or into the at least one supporting lateral surface. Advantageously, the main axes of the at least one supporting lateral surface and the at least one counter-supporting lateral surface can extend parallel in relation to the mounting direction of the filter element relative to the filter housing, in particular to the housing component with the at least one support portion when the filter element is mounted. In this way, the at east one supporting lateral surface and the at least one counter-supporting lateral surface can automatically be brought into relation when mounting the filter element in the filter housing, in particular when assembling the filter housing. Advantageously, the at least one supporting lateral surface can easily be brought into relation with the at least one counter-supporting lateral surface when mounting a housing cover to a housing pot.

Advantageously, the at least one counter-supporting lateral surface can be at least sectionwise complementary to the at least one supporting lateral surface. In this way, the at least one supporting lateral surface can abut on the at least one counter-supporting lateral surface nearly clearance-free. By so doing, a reliable and stable support can be realized transversely, in particular radially or tangentially, in relation to the element axis.

Advantageously, the at least one counter-supporting lateral surface can be straight-cylindrical and/or straight-conical. The at least one counter-supporting lateral surface can also at least sectionwise be slanted-cylindrical and/or slanted-conical.

The at least one counter-supporting lateral surface can advantageously define an oval, flat oval or round cross-section. It can also define a different, in particular an angular, cross-section.

The at least one counter-supporting lateral surface can be enclosed circumferentially. It can also feature discontinuities.

The at least one support portion can also feature more than one counter-supporting lateral surface, preferably two counter-supporting lateral surfaces.

Advantageously, the at least one support portion can feature a frontal groove, in particular a counter-support groove, which extends circumferentially relative to the main axis. The groove can advantageously be on a front face of the at least one support portion facing the filter element. A radially inner counter-supporting lateral surface can be realized as the radially inner circumferential side of the groove relative to the main axis of the at least one support portion. As an alternative or in addition, the radially outer counter-supporting lateral surface can be realized as the radially outer circumferential side of the groove.

As an alternative, the at least one support portion can advantageously feature a hollow-cylindrical or sleeve-like portion. A radially inner counter-supporting lateral surface can be realized relative to the main axis of the at least one support portion by the radially inner circumferential side of the hollow-cylindrical or sleeve-like portion. As an alternative or in addition, a radially outer counter-supporting lateral surface can be realized by the radially outer circumferential side of the hollow-cylindrical or sleeve-like portion.

In a further advantageous embodiment, at least one supporting lateral surface can be directed radially inwards relative to its main axis and surround a hollow space of the at least one supporting element, which can be open at the corresponding free end of the at least one supporting element, at least one counter-supporting lateral surface can be directed radially outwards relative to its main axis and the counter-supporting lateral surface can be inserted into the hollow space of the at least one supporting element if the filter element is correctly installed.

Advantageously, the at least one support portion can be a kind of pillar or dome, surround it or be part of it. At least one counter-supporting lateral surface can be disposed at the free end of the pillar or dome. With the other end, the pillar or dome can be connected with the filter housing, in particular with the housing cover. It can in particular be connected as one piece with the filter housing.

The pillar or dome can advantageously extend through a room section of the filter housing. By so doing, the filter element can be supported in a distance bridged by the pillar or dome in relation to a corresponding housing wall of the filter housing. Advantageously, the room section can be flowed through by air during operation of the air filter. According to the flow direction of the air in the filter housing, the room section can be an inlet room section or an outlet room section.

As an alternative, the at least one or a further counter-supporting lateral surface can advantageously be directed radially inwards relative to its main axis. The counter-supporting lateral surface can surround a hollow space of the at least one support portion, which is open at the corresponding free end of the at least one support portion. The at least one or a further supporting lateral surface can be directed radially outwards relative to its main axis. If the filter element is correctly installed, the at least one supporting lateral surface can be inserted into the hollow space of the at least one support portion.

In a further advantageous embodiment, a supporting element can be disposed centrally relative to the element axis on the front faces of the filter element. In this way, the filter element can be supported centrally. By so doing, a uniform support of the filter element on the filter housing can also be achieved only with one supporting element and only one corresponding support portion. In this way, the support can be realized with little required space for the components required for this purpose in the filter housing.

Advantageously, several different supporting elements can additionally be provided at the filter element with corresponding support portions on the housing. Advantageously, the additional supporting elements relative to the element axis can be disposed circumferentially on the front face of the filter element, at which the at least one supporting element is disposed. The additional supporting elements can advantageously be disposed in a edge area of the front face. Advantageously, the additional supporting elements can support the filter element relative to the element axis in radial direction against the corresponding additional support portions of the filter housing.

The additional supporting elements can advantageously be ribs. The additional supporting elements can advantageously be resilient. In this way, they can furthermore contribute to a tolerance compensation and/or to a vibration damping.

In a further advantageous embodiment, a support portion relative to a housing axis, which coincides with the element axis when the filter element is installed, can be disposed centrally. This support portion can easily interact with the corresponding centrally disposed supporting element.

In a further advantageous embodiment, several supporting elements can be disposed on one of the front faces of the filter element. By so doing, the support can be further improved. In this way, a tilting of the filter element relative to the element axis can be avoided.

Advantageously, two supporting elements can be disposed on one of the front faces of the filter element on approximately opposing sides of the element axis. In this way, a uniform support of the filter element can be realized on opposing sides of the element axis.

Advantageously, the supporting elements can each be disposed in circumferential edge areas of the front face. By so doing, the lever ratios can be improved thanks to the corresponding distance to the element axis. In this way, vibrations and mechanical loads can be introduced more evenly into the filter element. In this way, the mechanical load of the load can be reduced as a whole.

In a further advantageous embodiment, several support portions can be disposed on the filter housing. The support portions can advantageously be allocated to corresponding supporting elements on the filter element.

Advantageously, two support portions can be disposed on approximately opposing sides of a housing axis, which coincides with the element axis when the filter element is installed. More than two support portions for more than two supporting elements can also be disposed evenly or unevenly.

In a further advantageous embodiment, the at least one supporting element and the at least one support portion can be disposed on a raw air side of the filter element. In another embodiment, supporting element and support portion can be disposed on a clean air side.

Advantageously, a gap can be realized between the filter element in the area of the front face with the at least one supporting element and an internal wall of the filter housing surrounding the filter element radially outside. Air can flow through the gap into the room surrounding the filter medium radially outside or flow out of it. In this way, an air flow can flow axially in relation to the element axis from an inlet room section of the filter housing to the inflow side of the filter medium. Depending on the flow direction, the inflow side of the filter medium can be disposed in the element interior space or on the radially outer circumferential side of the filter element. Accordingly, the air can flow axially in relation to the element axis from the outflow side of the filter medium into a corresponding outlet room section of the filter housing. Thanks to the axial air flow it is possible to realize an improved pack size of the filter housing and therefore little required space. Furthermore, an axial air flow towards the inflow side and/or away from the outflow side can reduce a pressure difference between inflow side and outflow side. In this way, in particular a lower pressure difference can be realized than with a comparable air filter, in which the air flow is conveyed tangentially towards the inflow side of the filter element or discharged from the outflow side.

In a further advantageous embodiment, the at least one supporting element can be disposed or integrally molded to an end body, in particular an end disk, of the filter element. The supporting element can be integrated into the end body or separately manufactured and connected therewith.

Advantageously, the end body, in particular the end disk, can face with the at least one supporting element an inlet room section of the filter housing for air to be cleaned. The inlet room section can advantageously be connected with the at least one inlet. By so doing, the at least one supporting element can be disposed on the raw air side of the filter medium.

The filter medium can be stabilized with the at least one end body. Furthermore, the filter medium can be sealed on the front face with the at least one end body.

The at least one end body can advantageously be made of synthetic material. It can advantageously be glued, welded or connected in any other way with the front face of the filter medium. The material of which the end body consists can advantageously also be foamed onto or foamed into the front face of the filter medium.

Advantageously, the at least one supporting element can be firmly connected with the at least one end body. The at least one supporting element be in particular glued, welded or foamed as separate component with the end body or firmly connected with it in another way. The at least one supporting element can also in particular be connected mechanically with the end body by means of a locking connection, a snap-in connection or in any other way. The at least one supporting element can be connected detachably or undetachably with the end body.

In a further advantageous embodiment, a sealing can be disposed between the filter element and the filter housing on the front face of the filter medium opposing the at least one supporting element. With the sealing, the filter element can be sealed in axial and/or radial direction against the filter housing.

The sealing can furthermore feature a supporting function. Advantageously, the filter element can be supported by means of the sealing in axial and/or radial direction against the filter housing. The sealing can be used as counter bearing for the at least one supporting element in axial direction. In this way, the filter element can be clamped between the sealing and the at least one supporting element.

Advantageously, the sealing can be made of a resilient material, in particular polyurethane, in particular polyurethane foam.

The sealing can advantageously interact with a corresponding housing-sided sealing surface. The housing-sided sealing surface can advantageously be disposed in a housing pot of the filter housing.

In another advantageous embodiment, an inlet-sided inlet room section, an element room section in which the filter element is disposed, and an outlet-sided outlet room section of the filter housing can be disposed linearly and along the flow path of the air through the air filter one after the other. By so doing, an axial inflow of the air towards the inflow side of the filter medium can be easily realized. Furthermore, an axial outflow of the filtered air from the clean air side of the filter element can be achieved in this way. In this way, possible pressure differences between the clean air side and the raw air side can be reduced. Advantageously, a main flow direction of the air from the inlet room section through the element room section into the outlet room section can be essentially axial in relation to the element axis.

In a further advantageous embodiment of the air filter, the at least one support portion features at least one continuous opening which is disposed in such a way that a portion of the filter element is visible through the opening from outside of the filter housing. In particular, a portion of the supporting element and/or the end face or an end body of the filter element is visible through the opening. The opening can, for example, be a borehole. Through the opening it can be recognized if a filter element is mounted in the filter housing, so that the opening functions as a mounting control. To avoid an air exchange with the interior space via the opening, the support portion at the housing and the supporting element at the filter element are preferably designed in such a way that the opening is sealed, A sealing is, for example, ensured via the supporting lateral surface and the counter-supporting lateral surface. The opening is preferably aligned in the axial direction of the housing.

The technical object for the filter element is furthermore achieved in that the filter element features on at least one axial front face relative to the element axis on an exterior side facing away from the element interior space at least one supporting element that comprises a supporting lateral surface which is designed at least sectionwise cylindrical or with a variable cross-section in the direction of a main axis of the supporting lateral surface, the main axis of which extending parallel or coaxially in relation to the element axis, and with which the at least one supporting element is supported at least transversely in relation to the element axis by at least one corresponding support portion on the side of a filter housing of the air filter into which the filter element can be mounted.

The advantages and features listed in conjunction with the air filter according to the invention and its advantageous embodiments are correspondingly valid for the filter element according to the invention and its advantageous embodiments.

The technical object for the filter element according to the invention is furthermore achieved in that on the side of the filter housing at least one support portion is disposed which comprises a counter-supporting lateral surface, the main axis of which extends parallel or coaxially in relation to a housing axis which is axial in relation to the element axis when the filter element is installed, which is designed at least sectionwise cylindrical or with a variable cross-section in the direction of the main axis, and against which a corresponding supporting element, which is disposed at an exterior side facing away from the element interior space on at least one axial front face of the filter element relative to the element axis, can be supported at least transversely in relation to the housing axis.

The advantages and features listed in conjunction with the air filter according to the invention and the filter element according to the invention and their advantageous embodiments are correspondingly valid for the filter housing according to the invention and its advantageous embodiments.

BRIEF DESCRIPTION OF THE DRAWINGS

Other advantages, features and details of the invention will become apparent from the following description where examples of the embodiment of the invention will be explained in detail with reference to the drawing. A person of skill in the art will expediently consider the features disclosed in combination in the drawing, the description and the claims also individually and combine them to other meaningful combinations. Schematically shown is in FIG. 1 a length-sided section of an air filter of an internal combustion engine according to a first example of an embodiment with a replaceable flat oval round filter element;

FIG. 4 an isometric representation of the round filter element in the FIGS. 1 to 3 with view direction towards an inlet-sided end disk with a supporting element;

FIG. 5 an isometric representation of the round filter element in the FIGS. 1 to 4 with view direction towards an outlet-sided end disk;

FIG. 7 a length-sided partial section of the round filter element in FIG. 6;

FIG. 8 a top view of the round filter element in the FIGS. 6 and 7 towards an inlet-sided end disk with two supporting elements;

Identical components in the figures have the same reference numerals.

DETAILED DESCRIPTION

Figure 3:
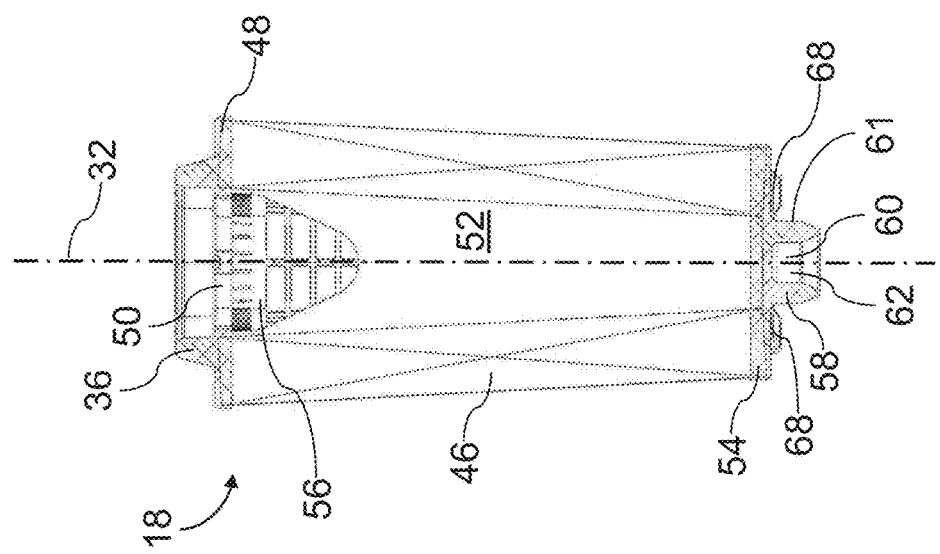
FIG. 3 a transverse-sided longitudinal section of the round filter element in FIG. 2 along the cutting line III-III shown there.
Figure 2:
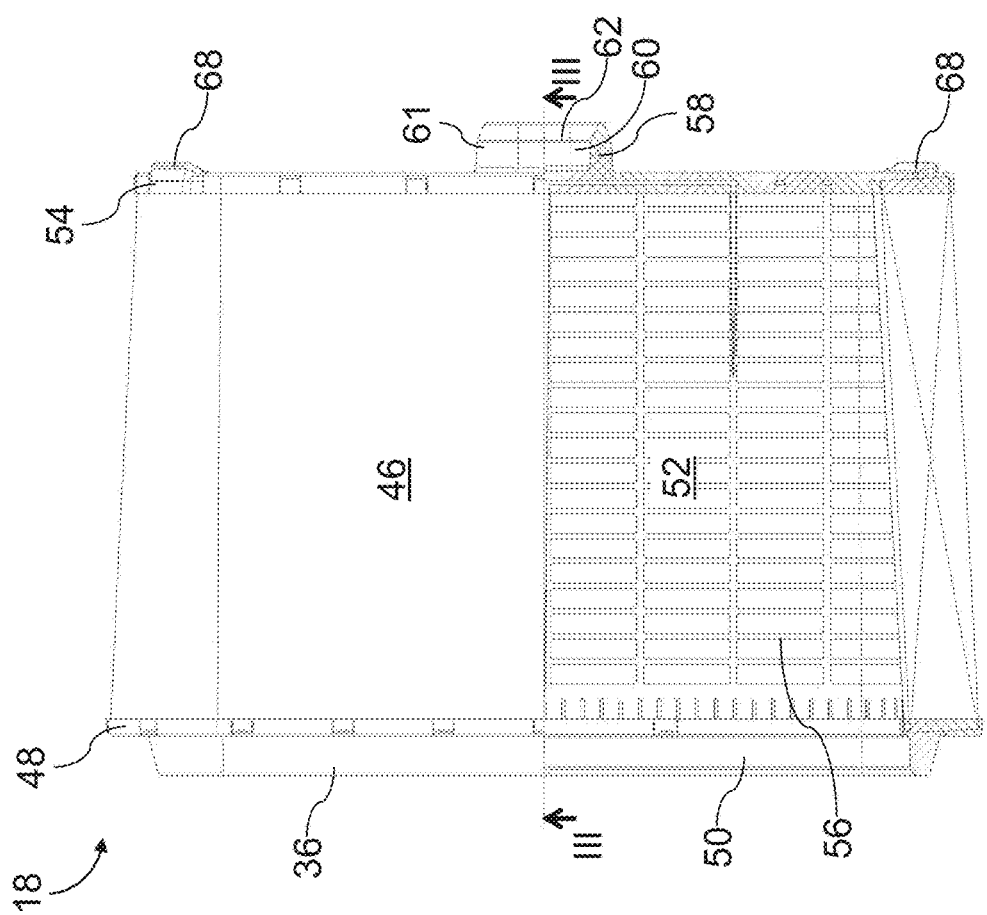
FIG. 2 a length-sided partial section of the round filter element in FIG. 1.

FIG. 1 shows an air filter 10 of an air intake tract of an internal combustion engine of a commercial vehicle according to a first example of an embodiment in a length-sided section. The air filter 10 is disposed in an air intake tract of the internal combustion engine. It is used for cleaning the combustion air that is conveyed to the internal combustion engine for combustion.

The air filter 10 comprises an openable filter housing 12. The filter housing 12 is flat oval. Compared with an oval filter housing with an approximately elliptic cross-section, the filter housing 12 is flattened in the direction of its short transverse axis. In FIG. 1, the section is shown along a long transverse axis of the filter housing 12 The filter housing 12 has a housing pot 14, in FIG. 1 at the left, and a housing cover 20, in FIG. 1 at the right. The housing pot 14 has a mounting opening 16, in FIG. 1 at the right, for mounting a filter element 18. The mounting opening 16 is closed with the housing cover 20.

The housing pot 14 features an outlet 22 for the filtered air which ends in an outlet room section 24 of the housing pot 14. The outlet 22 is connected with the internal combustion engine outside of the filter housing 12 via air ducts not shown here.

The housing cover 20 has an inlet 26 for air to be filtered, which ends in an inlet room section 28 of the housing cover 20 and is connected with the surrounding outside of the filter housing 12.

The filter element 18 is disposed in an element room section 30 of the housing pot 14 in such a way that it separates the inlet 26 from the outlet 22. The element room section 30 is disposed in linear arrangement between the inlet room section 28 and the outlet room section 24.

The inlet room section 28, the element room section 30 and the outlet room section 24 are disposed axially one after the other in relation to an axis 32. The axis 32 coincides with a housing axis of the filter housing 12. In the present example of an embodiment, the axis 32 coincides also with a mounting direction in which the filter element 18 can be inserted into the housing pot 14 and removed therefrom. Furthermore, the axis 32 coincides in the present example of an embodiment with a mounting direction in which the housing cover 20 is mounted on the housing pot 14. The mounting opening 16 surrounds the axis 32 circumferentially.

If, in the following, it is referred to "axial", "radial", "circumferential" or "coaxial", this refers to the axis 32, unless otherwise specified.

Axially between the element room section 30 and the outlet room section 24, the housing pot 14 features a circumferentially closed sealing surface 34. The sealing surface 34 extends in a radial direction. The sealing surface 34 faces towards the housing cover 20. A sealing member 36 of the filter element 18 may directly contact the sealing surface 34 sealingly in a circumferentially closed manner.

The radially inner cross-section of the element room section 30 is larger than a radially outer cross-section of the sealing surface 34.

An annular inflow room 38 is realized between a radially outer circumferential side of the filter element 18 and the radially inner circumferential side of the element room section 30. The annular inflow room 38 is separated from the outlet room section 24 by means of the sealing member 36.

On the side facing the housing cover 20, the annular inflow room 38 is connected with the inlet room section 28 via a circumferential gap 40. The inlet room section 28 and the annular inflow room section 38 are disposed on the raw air side of the filter element 18.

The filter element 18 protrudes axially into the inlet room section 28 and into the gap 40 in radial direction and overlaps the gap 40. The inlet room section 28 has its maximum axial extension in an area in which the inlet 26 is disposed. The maximum axial extension of the inlet room section 28 is approximately as large as the axial extension of the element room section 30.

The outlet room section 24 has its maximum axial extension in an area in which the outlet 22 is disposed. The maximum axial extension of the outlet room section 24 is a little bit smaller than the maximum axial extension of the inlet room section 28 and the axial extension of the element room section 30.

A supporting pillar 42 is integrally/unitarily formed with and directly on or disposed at the housing cover 20. It is connected with the housing cover 20 in one piece forming a one-piece component. The supporting pillar 42 is elongated to extend approximately coaxial in relation to the axis 32, which means coaxial in relation to the housing axis. It is centrally disposed relative to the housing axis. The supporting pillar 42 extends into the inlet room section 28 from an interior side of the housing cover 20 facing the filter element 18 to abut or engage the inlet-sided front face of the filter element 18. The supporting pillar 42 is disposed on the raw air side of the filter medium 46.

On the free front face of the supporting pillar 42 proximate to and facing the filter element 18, a circumferentially extending coaxial counter-support groove is disposed in relation to a main axis of the supporting pillar 42, which means in relation to the axis 32 and to the housing axis. The counter-support groove is a hollow space in the supporting pillar 42, which is open towards the free front face of the supporting pillar 42. A radially inner peripheral wall of the counter-support groove forms a radially inner counter-supporting lateral surface 44. The radially inner counter-supporting lateral surface 44 is directed radially outwards relative to the main axis of the supporting pillar 42. A radially outer peripheral wall of the counter-support groove forms a radially outer counter-supporting lateral surface 45. The radially outer counter-supporting lateral surface 45 is directed radially inwards relative to the main axis of the supporting pillar 42. The counter-supporting lateral surfaces 44 and 45 are coaxial in relation to the axis 32. They have a cylindrical extension. Furthermore, they have an oval cross-section. The long transverse axis of the respective oval is located in the projection plane of FIG. 1, the short transverse axis is located perpendicular on the projection plane.

The filter element 18 is shown in different detail views in the FIGS. 2 to 5. The filter element 18 is a conical, flat oval round filter element. The filter element 18 is coaxial in relation to an element axis If the filter element 18 is installed, the element axis coincides in the shown example of an embodiment with the housing axis, which means the axis 32. The filter element 18 has a flat oval cross-section. The long transverse axis of the oval is located in the projection plane of FIG. 1, the short transverse axis is located perpendicular on the projection plane. In the direction of the short transverse axis, the filter element 18 is additionally flattened, therefore the designation "flat oval". In contrast, "oval" designates an approximately elliptic cross-section. A radially outer circumferential side and a radially inner circumferential side of the filter element 18 have a conical extension each. The external cross-section and the internal cross-section of the filter element 18 taper from its outlet-sided front face facing the outlet room section 24 towards the inlet-sided front face.

The filter element 18 comprises a zigzag-folded filter medium 46 circumferentially closed relative to an element axis. The filter medium 46 is a filter paper, which is appropriate for filtering air. However, the filter medium can also be a different filter medium appropriate for filtering air, for example filter fleece. The filter medium 46 can be single-layer or multi-layer.

On its outlet-sided front face, the filter medium 46 is connected with a coaxial outlet-sided end disk 48. The outlet-sided end disk 48 is made of an elastomer. It is sealingly glued with the front face of the filter medium 46. It can also be connected with the filter medium 46 in a different way. It may, for example, also be welded or pre-foamed or foamed. The radially outer circumferential side of the outlet-sided end disk 48 contacts the radially inner circumferential side of the housing pot 14 with a minimum of clearance.

The outlet-sided end disk 48 has a central outlet opening 50. The outlet opening 50 extends across the whole radially inner cross-section of the filter medium 46. Above the outlet opening 50 is connected an element interior space 52 of the filter element 18, which is surrounded by the filter medium 46, with the outlet room section 24.

On the exterior side of the outlet-sided end disk 48 axially opposing the filter medium 46 is disposed the sealing member 36. The sealing member 36 is made of resilient polyurethane foam. It is foamed to the outlet-sided end disk 48. Instead of polyurethane foam, the sealing member 36 can be made of a different, preferably resilient, material, for example of a synthetic material. Instead of being foamed to the outlet-sided end disk 48, it can also be connected in another way with it. The sealing member 36 is coaxial in relation to the element axis and surrounds the outlet opening 50 circumferentially. It extends in axial direction. It is supported in axial direction by the sealing surface 34 of the housing pot 14.

On the inlet-sided front face, the filter medium 46 is sealingly connected with an inlet-sided end disk 54. The inlet-sided end disk 54 closes the element interior space 52 towards the inlet room section 28, The inlet-sided end disk 54 is connected sealingly with the filter medium 46 in a similar way as the outlet-sided end disk 48. It can also be connected with the filter medium 46 in a different way.

A coaxial support tube 56 extends in the element interior space 52 between the inlet-sided end disk 54 and the outlet-sided end disk 48. The support tube 56 is made of synthetic material. It has a grid-like shape. Its circumferential side is permeable to air. The support tube 56 has a conical flat oval form corresponding to the filter medium 46. The radially inner circumferential side of the filter medium 46 is supported by the radially outer circumferential side of the support tube 56.

On the axial exterior side of the end disk 54 facing away from the element interior space 52 is disposed a supporting element 58. The supporting element 58 is disposed on the raw air side of the filter medium 46. The supporting element 58 is firmly connected with the inlet-sided end disk 54. The supporting element 58 is made of a resilient material. For example, it can be made of a polyurethane foam. The supporting element 58 is foamed to the inlet-sided end disk 54. It can also be connected in a different way with the inlet-sided end disk 54. It is also possible to use a supporting element that is connected in one piece with the inlet-sided end disk 54.

The supporting element 58 has a sleeve-like design. It has the form of a hollow cylinder the main axis of which extends coaxially in relation to the element axis in the shown example of an embodiment. The supporting element 58 has an approximately oval cross-section. Its short transverse axis is located in the projection plane of FIG. 1, its long transverse axis is located perpendicular on the projection plane. The orientation of the supporting element 58 relative to the axis 32, which means the housing axis, corresponds therefore to the orientation of the counter-supporting lateral surfaces 44 and 45.

The radially inner circumferential side of the supporting element 58 forms a radially inner supporting lateral surface 60. The radially inner supporting lateral surface 60 surrounds a hollow space 62 of the supporting element 58. One main axis of the radially inner supporting lateral surface 60 is, in the shown example of an embodiment, coaxial in relation to the main axis of the supporting element 58 and therefore also in relation to the element axis. The radially inner supporting lateral surface 60 is directed radially inwards relative to its main axis. The internal cross-section of the radially inner supporting lateral surface 60 corresponds to the external cross-section of the radially inner counter-supporting lateral surface 44.

The radially outer circumferential side of the supporting element 58 forms a radially outer supporting lateral surface 61. The main axis of the radially outer supporting lateral surface 61 is coaxial in relation to the main axis of the radially inner supporting lateral surface 60. The radially outer supporting lateral surface 61 is directed radially outwards relative to its main axis. The external cross-section of the radially outer supporting lateral surface 61 corresponds to the internal cross-section of the radially outer counter-supporting lateral surface 45.

The portion of the supporting pillar 42 surrounded by the counter-support groove and carrying the radially inner counter-supporting lateral surface 44 is inserted into the hollow space 62 of the supporting element 58, if the filter element 18 is correctly mounted. The hollow-cylindrical, sleeve-like supporting element 58 is inserted into the counter-support groove of the supporting pillar 42. The radially inner supporting lateral surface 60 contacts the radially inner counter-supporting lateral surface 44. The radially outer supporting lateral surface 61 contacts the radially outer counter-supporting lateral surface 45.

On its side facing the end disk 54 are located the radially inner supporting lateral surface 60 and the radially outer supporting lateral surface 61 of the supporting element 58 cylindrically with an oval cross-section. On its free side facing away from the end disk 54, the radially inner supporting lateral surface 60 features a conical portion, the internal cross-section of which expands outwardly towards the free end of the supporting element 58. The external cross-section of the radially outer supporting lateral surface 61 decreases in the conical portion towards the free end of the supporting element 58. All in all, the wall thickness of the supporting element 58 decreases in the conical portion towards the free edge. In this way, the insertion of the supporting element 58 into the counter-support groove of the supporting pillar 42 can be simplified.

The filter element 18 is supported with the supporting element 58 against the filter housing 12 via the supporting pillar 42. The support is realized radially, which means transversely to the element axis and to the housing axis, and axially. Due to the interacting of the supporting element 58 with the supporting pillar 42, the filter element 18 is held radially and positioned axially inlet-sided, which means on the side of the raw air. In this way, the filter element 18 can be held on the side in the filter housing 12 facing the inlet room section 28 without the gap 40 being hidden by the required holding members.

Furthermore, two supporting ribs 68 each are disposed at the radially outer edges of the inlet-sided end disk 54 in the area of the short transverse sides. The supporting ribs 68 protrude each the inlet-sided end disk 54 in radial direction as well as in axial direction. The supporting ribs 68 are supported each by corresponding supporting points not shown in the figures on the interior side of the housing cover 20 in radial direction.

When operating the air filter 10, the air to be filtered flows through the inlet 26, as indicated by an arrow 64, into the inlet room section 28. From there, the air flows essentially in axial direction through the gap 40 into the annular inflow room 38 on the inflow side of the filter medium 46. The air flows through the filter medium 46 from radially outside to radially inside and is cleaned. The cleaned air flows through the circumferential side of the support tube 56 and reaches the element interior space 52. The cleaned air leaves the element interior space 52 essentially in axial direction and reaches the outlet room section 24. From there, the filtered air leaves the filter housing 12 through the outlet 22, as indicated by an arrow 66.

For maintenance purposes, for example for cleaning or replacement of the filter element 18, the filter housing 12 can be opened. For this purpose, the housing cover 20 is removed in axial direction from the housing cover 14. In doing so, the supporting element 58 is automatically pulled out of the counter-support groove at the end of the supporting pillar 42. The filter element 18 is pulled out of the element room section 30 of the housing pot 14 in axial direction. It can be replaced by a new filter element 18 or reinserted after cleaning.

For the assembly, the filter element 18 is inserted with the outlet-sided end disk 48 ahead in axial direction into the housing pot 14 until the sealing member 36 abuts on the sealing surface 34. Subsequently, the housing cover 20 is placed with its open side ahead in axial direction on the mounting opening 16 of the housing pot 14. The supporting element 58 is inserted into the counter-support groove of the supporting pillar 42. The portion with the radially inner counter-supporting lateral surface 44 at the end of the supporting pillar 42 engages into the hollow space 62 of the supporting element 58.

Figure 6:
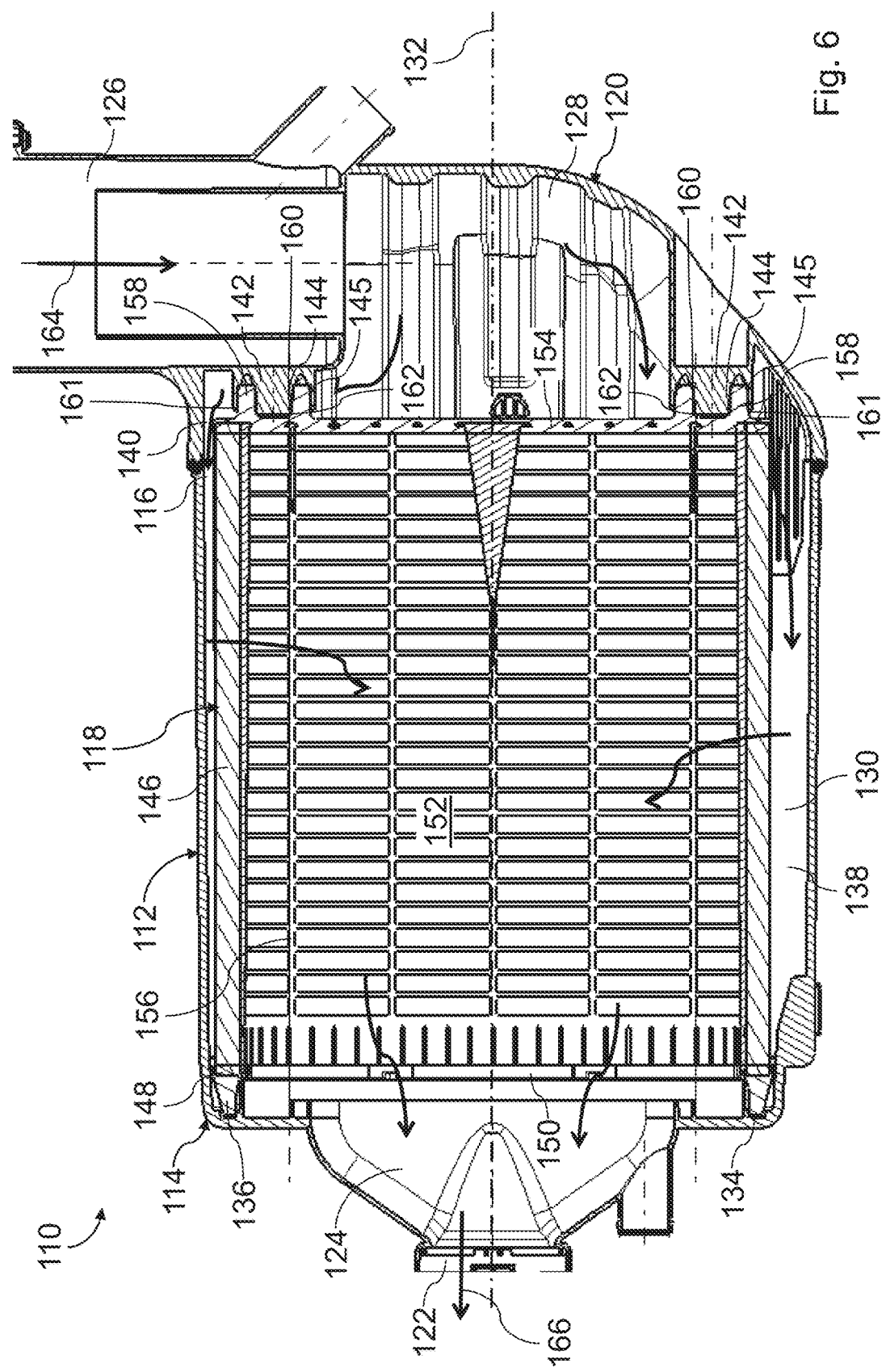
FIG. 6 a length-sided section of an air filter of an internal combustion engine according to a second example of an embodiment with a replaceable flat oval round filter element.
Figure 10:
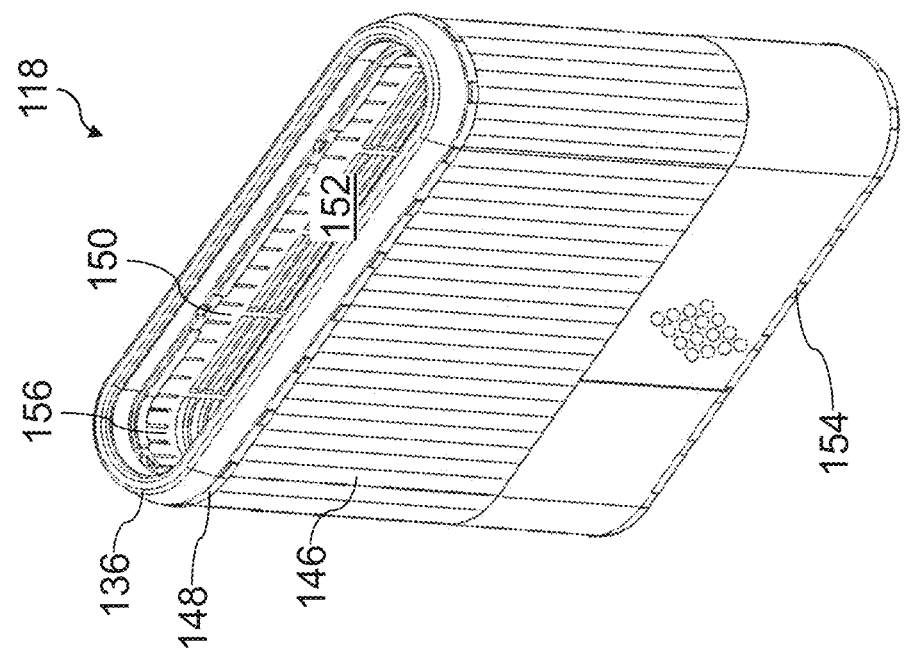
FIG. 10 an isometric representation of the round filter element in the FIGS. 6 to 9 with view direction towards an outlet-sided end disk.
Figure 9:
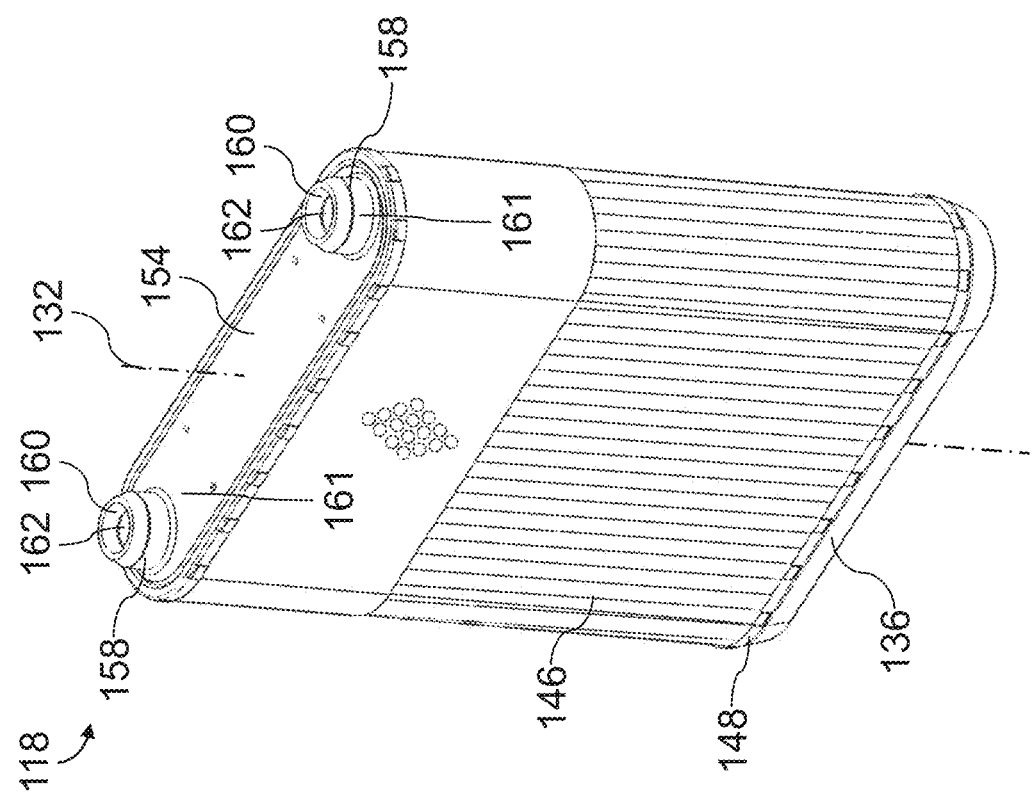
FIG. 9 an isometric representation of the round filter element in the FIGS. 6 to 8 with view direction towards an inlet-sided end disk.

FIG. 6 shows a second example of an embodiment of an air filter 110. Those elements that are similar to those in the first example of an embodiment in FIGS. 1 to 5 have the same reference numerals with the difference that the value 100 is added. The second example of an embodiment differs from the first example of an embodiment in that in the second example of an embodiment, the filter element 118 features at its inlet-sided end disk 154 two supporting elements 158. The filter element 118 is shown in different perspectives in the FIGS. 7 to 10.

The supporting elements 158 have each the form of circular cylindrical sleeves. They are each disposed in the area of a transverse-sided margin of the inlet-sided end disk 154. The hollow spaces 162 of the supporting elements 158 are relative to a respective main axis of the supporting element 158 surrounded each by a radially inner supporting lateral surface 160. The radially inner supporting lateral surfaces 160 are each directed radially inwards relative to the main axis. In a conical portion on the free front face, the hollow spaces 162 expand each towards the free end of the supporting elements 158. The radially outer circumferential sides of the supporting elements 158 contact each the radially outer supporting lateral surfaces 161.

Furthermore, unlike the first example of an embodiment two supporting pillars 142 allocated to the supporting elements 158 are provided in the second example of an embodiment. The supporting pillars 142 extend each with their main axis parallel in relation to axis 132, which means parallel in relation to the housing axis of the filter housing 112.

In analogy to the first example of an embodiment, the sleeve-like supporting elements 158 stick each in a counter-support groove on the free front faces of the supporting pillars 142. In this case, the portions carrying the radially inner counter-supporting lateral surfaces 144 at the free ends of the supporting pillars 142 stick in the corresponding hollow spaces 162 of the supporting elements 158. The radially outer counter-supporting lateral surfaces 145 of the supporting pillars 142 surround each the radially outer supporting lateral surfaces 161 of the supporting elements 158. The supporting elements 158 are supported in radial direction relative to their main axes. The supporting elements 158 are supported in axial direction relative to the axis 132, which means in the shown example of an embodiment the element axis and the housing axis. Depending on the circumferential side of the supporting element 158, each supporting element 158 is supported in radial or tangential direction or in another direction transversely to the axis 132. A rotation of the filter element 118 in the area of the inlet-sided end disk 158 around the axis 132, which means presently the housing axis, can be avoided in this way.

Unlike the first example of an embodiment, the filter element 118 has a cylindrical design. It is a cylindrical, flat oval round filter element.

Furthermore, the supporting ribs 68 in the first example of an embodiment are no longer required in the second example of an embodiment.

Figure 11:
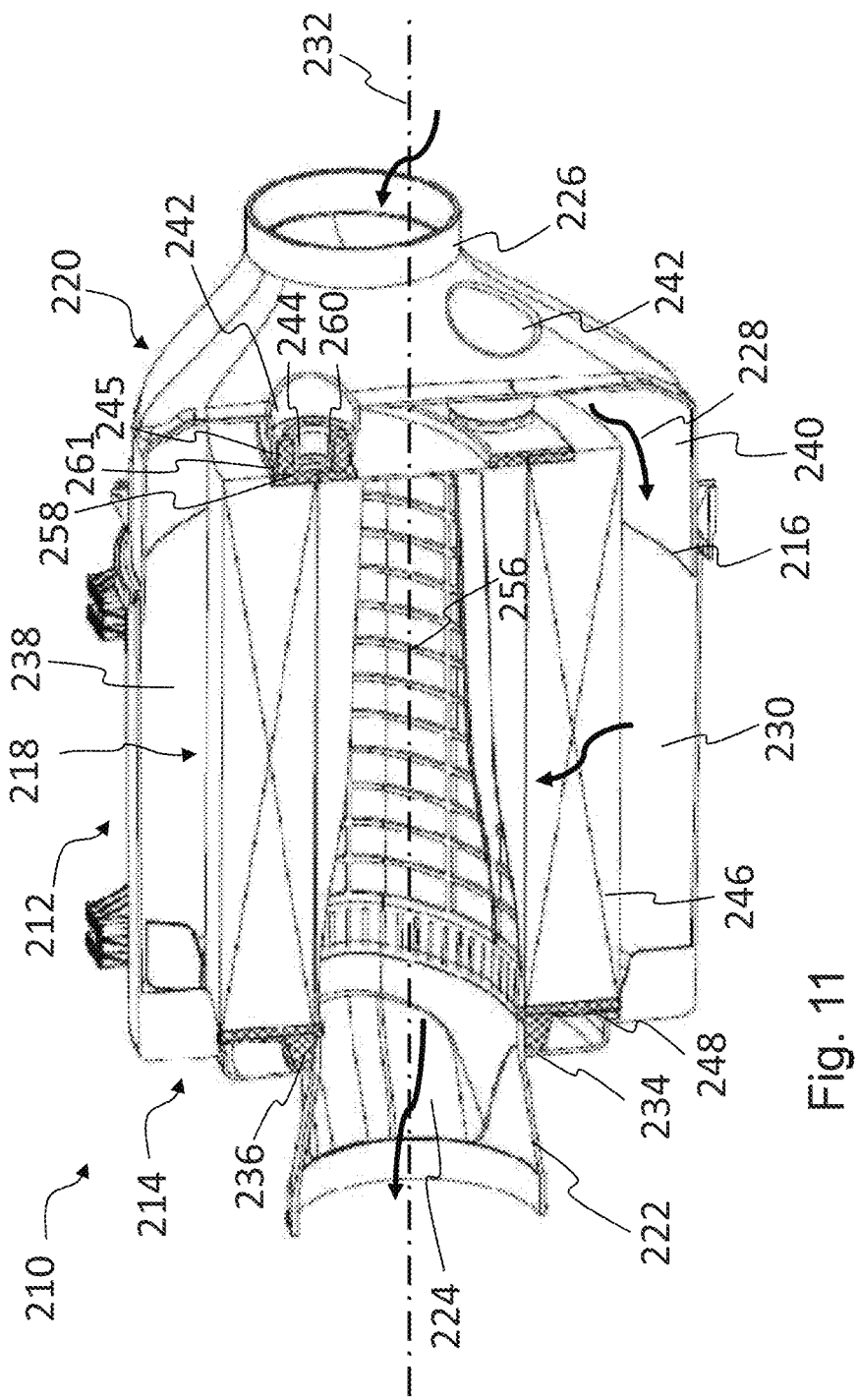
FIG. 11 an isometric representation of a transverse-sided cut air filter of an internal combustion engine according to a third example of an embodiment with a replaceable cylindrical filter element.
Figure 12:
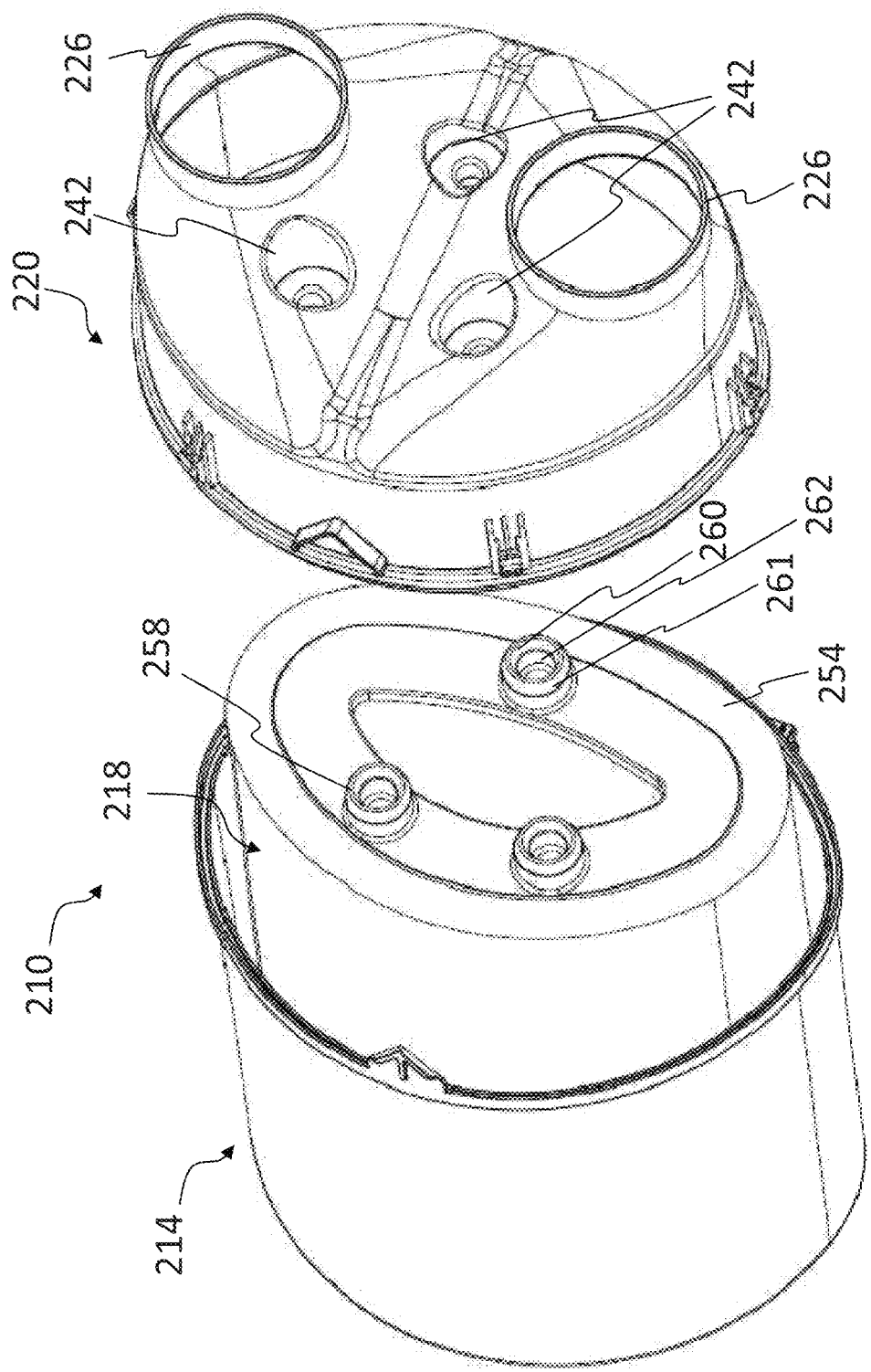
FIG. 12 a perspective representation of an air filter according to FIG. 11 with the filter element inserted into the housing pot and removed cover.

FIGS. 11 and 12 show a third embodiment of an air filter 210. The elements corresponding to the elements in the first example of an embodiment have the same reference numerals with the difference that the value of 200 is added. The air filter 210 can be mounted horizontally and as shown flowed through from right to left, or it can be mounted perpendicularly and flowed through from top to bottom.

The housing cover 220 has two inlets 226 for air to be filtered and an opposing outlet 222. Both inlets 226 are disposed symmetrically relative to the axis 232. As in the other embodiments, the element room section 230 is disposed in linear arrangement between the inlet room section 228 and the outlet room section 224.

The filter element 218 is cylindrical and has an oval-eccentric base area, which is mirror-symmetrical relative to a transverse axis. Three supporting elements 258 are integrally molded to the inlet-sided end disk 254. The inlet-sided end disk 258 is sectionwise made of resilient polyurethane and foamed to the filter medium. In the center, the end disk is formed by a plastic part, which is part of the support tube 256 of the filter element 218. The supporting elements 258 are designed as one piece with the resilient portion of the end disk 254.

The supporting elements 258 feature a circular cylindrical cross-section and define each a hollow space 262, which is surrounded by an inner supporting lateral surface 260, which is radially inwardly directed relative to a main axis of the supporting element 258. In analogy to the second example of an embodiment, the cylindrical portion ends in a conical portion. Because of this, the hollow spaces 262 expand at the free front face towards the free end of the supporting elements 258. The radially outer circumferential sides of the supporting elements 258 form each the radially outer supporting lateral surfaces 261.

For each of the three supporting elements 258, the housing 212 features a supporting pillar 242. The supporting pillars 242 extend each with their main axis parallel in relation to axis 232, and therefore parallel in relation to the housing axis of the filter housing 212. In analogy to the above examples of an embodiment, the supporting elements 258 are each inserted in a counter-support groove on the free front faces of the supporting pillars 242. In this connection, the radially inner supporting lateral surfaces 260 of the supporting elements 258 contact each a corresponding counter-supporting lateral surface 244 of the supporting pillars 242 and the radially outer supporting lateral surfaces 261 contact corresponding counter-supporting lateral surfaces 245. The supporting elements 258 are supported in radial direction relative to their main axis. Relative to the axis 232, which coincides with a housing axis and an element axis, the supporting elements 258 are at least supported transversely, e.g. in radial or tangential direction. Furthermore, an axial support in the direction of the axis 232 is ensured via the supporting elements 258.

Due to the three supporting elements 258, the filter element 218 is solidly supported in a direction transversely towards and along the axis 232 in the housing 212. The arrangement of the supporting elements 258 and supporting pillars 242 enables an optimal flow into the filter element 218, for the cross-section of the annular gap 240, which connects the inlet room section 228 with the element room section 230, is not reduced hereby.

We claim:

1. An air filter, comprising:
a filter housing that is openable, the filter housing including
a housing pot having chamber inside of the housing pot;
a housing cover sealingly mounted onto and removable from the housing pot and closing over the chamber of the housing pot;
at least one inlet though which airflow to be cleaned enters the chamber in the housing pot of the filter housing;
at least one outlet through which cleaned air exits the chamber in the housing pot of the filter housing;
wherein the filter housing has a housing axis (32);
a filter element removeably and replaceably installed into the chamber in the housing pot of the filter housing, the filter element including:
a filter medium radially surrounding and defining an element interior space within the filter element;
an end disk arranged on a first axial end face of the filter element and closing the element interior space within the filter element;
wherein the filter element engages with an interior of the filter housing separating the at least one inlet from the at least one outlet;
wherein the filter element has an element axis (32; 132; 232);
at least one supporting element (58; 158; 258) formed as an annular projection having a first end arranged at and secured onto the end disk on an exterior of the filter element and projecting axially outwardly away from the filter element to a opposite second end, the exterior of the axial end face facing away from the element interior space, the at least one supporting element including
at least one supporting lateral surface (60, 61, 160, 161, 260, 261) extending axially between the first end and the opposite second end of the at least one supporting element and arranged on the at least one supporting element;
wherein the at least one supporting lateral surface has at least one of: at least one cylindrical portion arranged radially relative to the element axis (32; 132; 232) or at least one portion with a cross section that varies along a direction of the element axis (32; 132; 232);
wherein the at least one supporting element is mounted on and supported at least transversely in relation to the element axis (321; 132; 232) on at least one corresponding support member (42;142) formed as an axially projecting tubular support pillar (42) integrally formed with and arranged directly on the housing cover (20);
wherein the at least one supporting lateral surface includes a radially outer supporting lateral surface (61, 161, 261) on a radial outer side of the at least one supporting element (58; 158; 258);
wherein the at least one corresponding support member (42; 142; 242) includes
a first counter-supporting lateral surface (45, 145; 245) extending axially to and coaxial in relation to the element axis (32; 132; 232) and contacting directly against the radially outer supporting lateral surface (61, 161, 261) on a radially outer side of the at least one supporting element (58; 158; 258).

2. The air filter according to claim 1, wherein
the filter element includes a second axial end face;
wherein the at least one supporting element (58) is disposed centrally on the element axis (32) on one of the axial end faces of the filter element (18).

3. The air filter according to claim 1, wherein
the at least one corresponding support member (42) is disposed centrally on the housing axis, which coincides with the element axis (32) when the filter element (18) is installed in the filter housing.

4. The air filter according to claim 1, wherein
a plurality of supporting elements (158; 258) are disposed on one of the axial end faces of the filter element (118; 218).

5. The air filter according to claim 1, wherein
a plurality of support members (142; 242) are disposed on the filter housing (112; 212).

6. The air filter according to claim 1, wherein
the at least one supporting element (58; 158; 258) and the at least one corresponding support member (42; 142; 242) are arranged at a raw air side of the filter element (18; 118; 218).

7. The air filter according to claim 1, wherein
the at least one supporting element (58; 158; 258) is disposed or integrally molded directly on an end disk (54; 154) of the filter element (18; 118; 218).

8. The air filter according to claim 1, further comprising:
a sealing member (36; 136; 236) is disposed between, sealably compressed between and contacting the filter element (18; 118; 218) and the filter housing (12; 112; 212).

9. The air filter according to claim 1, wherein
an inlet-sided inlet room section (28; 128; 228),
an element room section (30; 130; 230) in which the filter element (18; 118; 218) is disposed, and
an outlet-sided outlet room section (24; 124; 224) of the filter housing (12; 112; 212) are disposed in sequence and linearly along a flow path of the air through the air filter (10; 110; 210), one after the other.

10. The air filter according to claim 1, wherein
the at least one corresponding support member (42; 142; 242) includes
at least one continuous opening extending from the exterior of the filter housing to the filter element such that the filter element (18; 118; 218) is visible through the opening from outside of the filter housing (12; 112; 212).

11. An filter housing of an air filter, comprising:
a housing pot having chamber inside of the housing pot;
a housing cover sealingly mounted onto and removable from the housing pot and closing over the chamber of the housing pot;
at least one inlet though which airflow to be cleaned enters the chamber in the housing pot of the filter housing;
at least one outlet through which cleaned air exits the chamber in the housing pot of the filter housing;
wherein the filter housing has a housing axis (32);
wherein a filter element according to claim 1 is disposed replaceably within the chamber in such a way that it separates the at least one inlet (26; 126; 226) from the at least one outlet (22; 122; 222);
wherein the at least one supporting element of the filter element is mounted on and supported at least transversely in relation to an element axis (321; 132; 232) on at least one corresponding support member (42;142) secured onto a side of the filter housing (12; 112; 212);
wherein the at least one corresponding support member (42; 142; 242) includes
at least one counter-supporting lateral surface (44, 45; 144, 145; 244, 245) extending axially to and coaxial in relation to the housing axis (32);
wherein the at least one corresponding support member is at least sectionwise designed cylindrical or with variable cross-section in the direction of the housing axis (32), and against which a corresponding supporting element (58; 158; 258) of the filter element can abut and engage;
wherein the at least one corresponding support member is disposed on an exterior side facing away from the element interior space (52; 152; 252) on at least one axial end face of the filter element (18; 118; 218) relative to the element axis (32; 132; 232);
wherein the at least one corresponding support member can be supported at least transversely in relation to the housing axis on the corresponding support member.

12. The air filter according to claim 1, wherein
the at least one supporting lateral surface includes a radially inner supporting lateral surface (60, 160, 260) on a radial inner side of the at least one supporting element (58; 158; 258) and faces radially inwardly relative to the element axis (32; 132; 232) and radially surrounds the hollow space (62; 162; 262) in the interior of the at least one supporting element;
wherein the hollow space (62; 162; 262) is open at the second end of the at least one supporting element (58; 158; 258);
a second counter-supporting lateral surface (44, 144; 244) extending axially to and coaxial in relation to the element axis (32; 132; 232) and engaging directly against the radially inner supporting lateral surface (60, 160, 260) on a radial inner side of the at least one supporting element (58; 158; 258) within the hollow space when the filter element (18; 118; 218) is correctly installed in the filter housing.

* * * * *